No. 785,995. PATENTED MAR. 28, 1905.
E. F. W. ALEXANDERSON.
WINDING FOR THREE PHASE MOTORS.
APPLICATION FILED AUG. 19, 1904.

WITNESSES:
Robt C. Chapman
Helen Orford

INVENTOR:
Ernst F. W. Alexanderson
by Albert G. Davis
Atty.

No. 785,995.   Patented March 28, 1905.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

WINDING FOR THREE-PHASE MOTORS.

SPECIFICATION forming part of Letters Patent No. 785,995, dated March 28, 1905.

Application filed August 19, 1904. Serial No. 221,321.

*To all whom it may concern:*

Be it known that I, ERNST F. W. ALEXANDERSON, a subject of the King of Sweden and Norway, residing at Schenectady, county of Schenectady, State of New York, have invented certain new and useful Improvements in Windings for Three-Phase Motors, of which the following is a specification.

My invention relates to drum-windings for three-phase motors; and its object is to reduce the number of slots required for a three-phase winding of a given number of poles.

In drum-windings as ordinarily arranged in order to produce evenly-spaced poles, while at the same time permitting the use of former-wound coils, it has heretofore been necessary to have the total number of slots a multiple of the number of poles and the number of phases. With a three-phase winding having a large number of poles the above arrangement necessitates a large number of slots. Furthermore, when it is attempted to design such a winding for more than one number of poles the total number of slots must be a multiple not only of the number of phases, but also of both numbers of poles. With high-potential machines the cost and difficulty of insulating the armature-coils increases with the number of slots, so that a three-phase winding for high potentials and for a large number of poles becomes excessively expensive.

The object of my invention is to provide a novel form of three-phase drum-winding whereby a total number of slots may be chosen which is not divisible by the number of poles and which may be smaller than the product of the number of poles multiplied by the number of phases. I accomplish this result by forming each phase of the winding of coils of such a width with respect to the distance between adjacent coils that each slot may contain two coils of different phases, thereby making it possible to use only one-half the usual number of slots.

My invention will best be understood by reference to the accompanying drawings, in which—

Figure 1:
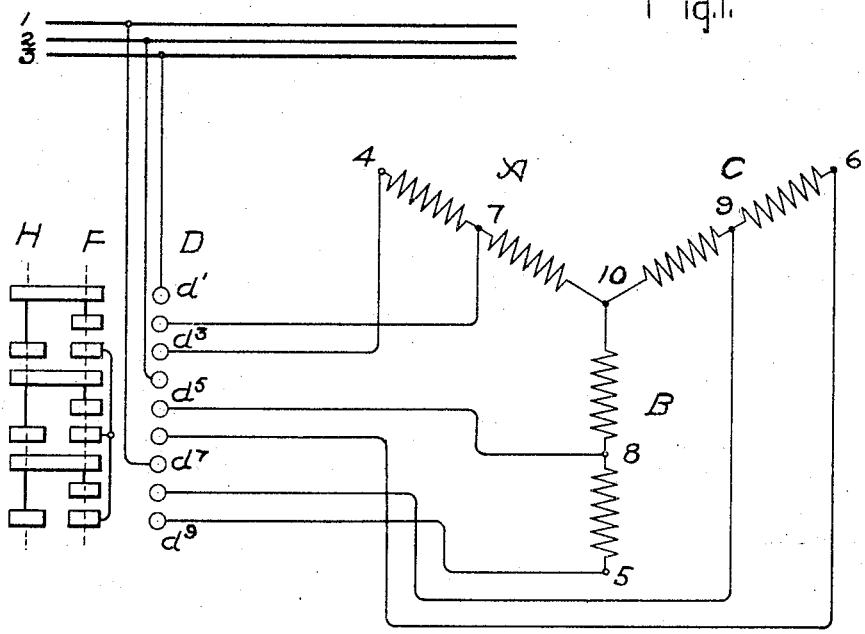
Figure 2:
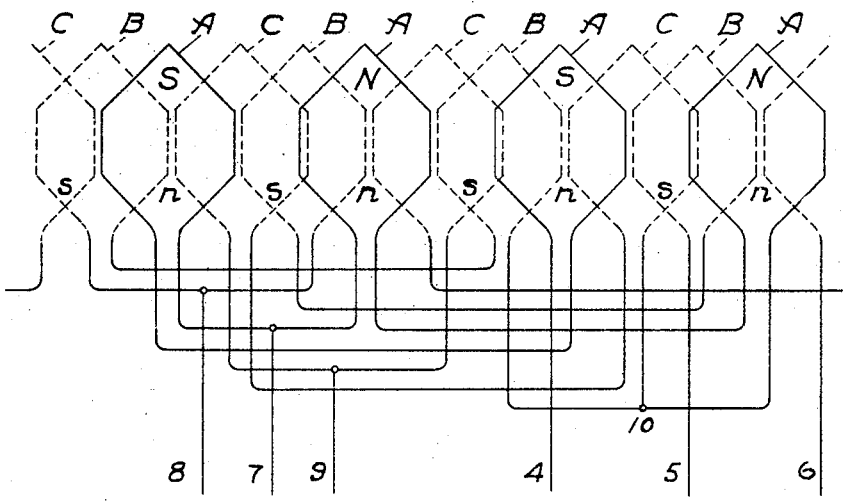

Figure 1 shows diagrammatically a three-phase winding provided with a controlling-switch adapted to vary its connections to produce two different numbers of poles. Fig. 2 shows a development of the winding on a plane surface and arranged in accordance with my invention.

Although I have illustrated and shall describe my invention as applied to a two-speed motor, since it is in a multispeed motor that the number of slots most frequently becomes excessive, nevertheless it will be understood that my invention is not limited to a multispeed motor, but is applicable to any three-phase machine in which it is desired to reduce the total number of slots below the product of the number of poles by the number of phases.

Referring first to Fig. 2, the development of a winding arranged in accordance with my invention is shown. One of the three phases only is shown in full lines, the others being indicated by dotted lines. It will be seen that adjacent coils of each phase are spaced from each other by a distance equal to one-half the width of each coil, and it will be seen that this ratio of coil width to spacing renders it possible for each slot to contain two coils of different phases. It is this feature that renders it possible to employ a smaller number of slots than the product of the number of poles by the number of phases.

I have shown the coils of each phase connected in two groups, alternate coils being connected in the same group in order that the direction of current may be reversed in alternate coils, so as to vary the number of poles in the manner well known in the art. This connection of the coils is indicated in Fig. 1, in which I have shown a three-phase Y connected with each phase in two groups. The three phases are connected, through a speed-changing switch D, to a source of three-phase current 1 2 3. The speed-changing switch D is shown as having two positions F and H, respectively. The position F corresponds to full speed of the motor, and when the switch is in this position the winding is connected for its smallest number of poles, as will be hereinafter explained. Position H corresponds to half-speed, in which the winding is connected to produce twice the number of poles which it has when operating at full speed. Leads are brought from the terminals of the Y 4 5 6 and also from the intermediate points 7, 8, and 9 to the controlling-switch.

The flow of current in the windings may be traced as follows for the two positions of the controlling-switch: With the controlling-switch in the position F the following circuits may be traced in Fig. 1: from line-wire 3, contact-finger $d'$, contact-finger $d^2$, terminal 7, through the two portions of phase A in parallel to the neutral point 10, and to terminal 4, which is connected, through contact-fingers $d^3$, $d^6$, and $d^9$, to terminals 5 and 6. Similar circuits may be traced for the other phases, and consequently it will be seen that in this position of the controlling-switch the three phases are connected to form two Y's in parallel. Now by referring to Fig. 2 and tracing the direction of current-flow through the coils marked A it will be seen that poles are produced, as indicated by the lines N S— that is, the motor is connected for four poles. It will be noticed that the width of each coil is two-thirds the pole-pitch.

With the controlling-switch in the position H a circuit may be traced in Fig. 1 from line-wire 3 to contact-finger $d'$, contact-finger $d^3$, terminal 4, through all of phase A to the neutral point 10 of the Y. Similar circuits may be traced for the other two phases. Now referring to Fig. 2 it will be seen by tracing out the relative directions of current-flow in the coils marked A that for a given direction of current-flow poles will be produced by these coils, as indicated by the letters $n$ $s$—that is, the winding produces eight poles. The width of a coil is four-thirds of the pole-pitch.

All eight-pole three-phase windings as hitherto constructed have required twenty-four slots as a minimum number. It will be seen that by my invention I provide an eight-pole three-phase winding which may be placed in twelve slots and which nevertheless is composed of former-wound coils. When the number of poles per phase becomes large, the insulation for high-potential machines is an important factor in the design, and the difficulty of insulation is greatly reduced by my invention.

Although I have shown my invention as applied to a two-speed motor, it will be understood that it is not limited to this particular application, but may be used with advantage for any three-phase drum-winding for generators or motors of the synchronous or non-synchronous type, in which it is desirable to reduce the number of slots. Accordingly I do not desire to limit myself to the particular arrangement shown; but in the appended claims I aim to cover all modifications which are within the scope of my invention.

What I claim as new, and desire to secure by Letters Patent of the United States, is—

1. In an alternating-current dynamo-electric machine, a three-phase winding composed of coils having a width equal to twice the distance between adjacent coils of the same phase.

2. In an alternating-current dynamo-electric machine, a three-phase winding each phase of which is composed of coils spaced by a distance equal to one-half the coil width.

3. In an alternating-current dynamo-electric machine, a three-phase winding disposed in slots, each slot containing conductors of two different phases.

4. In an alternating-current dynamo-electric machine, a three-phase winding composed of coils each disposed in two slots each common to another phase.

5. In an alternating-current dynamo-electric machine, a three-phase winding composed of coils having a width equal to twice the distance between adjacent coils of the same phase and each coil being disposed in two slots each common to another phase.

6. In an alternating-current dynamo-electric machine, a three-phase winding disposed in slots, each slot containing conductors of two different phases and each phase being composed of coils spaced by a distance equal to one-half the coil width.

7. In an alternating-current dynamo-electric machine, a three-phase winding composed of coils having a width equal to twice the distance between adjacent coils of the same phase, and means for varying the connections of said winding to vary the number of its poles.

8. In an alternating-current dynamo-electric machine, a three-phase winding composed of coils each disposed in two slots each common to another phase, and means for varying the connections of said winding to vary the number of its poles.

9. In an alternating-current dynamo-electric machine, a three-phase winding disposed in slots, each slot containing conductors of two different phases and each phase having its alternate coils connected in groups, and means for reversing the relative connections of said groups.

In witness whereof I have hereunto set my hand this 18th day of August, 1904.

ERNST F. W. ALEXANDERSON.

Witnesses:
BENJAMIN B. HULL,
HELEN ORFORD.